(12) United States Patent
Hu et al.

(10) Patent No.: US 12,015,501 B2
(45) Date of Patent: Jun. 18, 2024

(54) METHODS OF COORDINATING OPERATIONS OF MULTIPLE DOMESTIC APPLIANCES

(71) Applicant: Haier US Appliance Solutions, Inc., Wilmington, DE (US)

(72) Inventors: Haitian Hu, Louisville, KY (US); Adam Christopher Hofmann, Louisville, KY (US); John Michael Todd, Mount Washington, KY (US); Hairong Li, Louisville, KY (US)

(73) Assignee: Haier US Appliance Solutions, Inc., Wilmington, DE (US)

( * ) Notice: Subject to any disclaimer, the term of this patent is extended or adjusted under 35 U.S.C. 154(b) by 0 days.

(21) Appl. No.: 17/879,422

(22) Filed: Aug. 2, 2022

(65) Prior Publication Data

US 2024/0048403 A1 Feb. 8, 2024

(51) Int. Cl.
   *H04L 12/28* (2006.01)

(52) U.S. Cl.
   CPC ...... *H04L 12/2838* (2013.01); *H04L 12/2809* (2013.01); *H04L 2012/285* (2013.01)

(58) Field of Classification Search
   CPC ............. H04L 12/2838; H04L 12/2809
   USPC .................................................. 709/223
   See application file for complete search history.

(56) References Cited

U.S. PATENT DOCUMENTS

| | | | |
|---|---|---|---|
| 7,982,603 B2 | 7/2011 | Moriwake et al. | |
| 9,766,092 B2 | 9/2017 | Chung et al. | |
| 9,946,273 B2 | 4/2018 | Kusukame et al. | |
| 10,758,108 B2 * | 9/2020 | Thiyagarajan | F28D 21/0012 |
| 2013/0007126 A1 * | 1/2013 | Ziemann | G06Q 50/01 709/204 |
| 2014/0297738 A1 * | 10/2014 | King | G09B 19/0092 709/204 |
| 2016/0117636 A1 * | 4/2016 | Miller | G06Q 50/06 705/332 |
| 2023/0216703 A1 * | 7/2023 | Lee | H04L 12/2827 370/254 |

FOREIGN PATENT DOCUMENTS

| | | |
|---|---|---|
| CN | 110848756 A | 2/2020 |
| DE | 102012222248 A1 | 6/2014 |
| EP | 2248303 B1 | 12/2011 |
| WO | WO2013104511 A1 | 7/2013 |

* cited by examiner

*Primary Examiner* — Sibte H Bukhari
(74) *Attorney, Agent, or Firm* — Dority & Manning, P.A.

(57) ABSTRACT

A method of operating a first domestic appliance associated with a user account and a second domestic appliance associated with the user account may include receiving a parameter signal including a parameter value from the first domestic appliance. The method may also identifying the parameter value as corresponding to a sharable parameter. The method further include recording the parameter value within a sharable field set of a pre-constructed table, after which the parameter value may be shared or analyzed further.

18 Claims, 5 Drawing Sheets

METHODS OF COORDINATING OPERATIONS OF MULTIPLE DOMESTIC APPLIANCES

FIELD OF THE INVENTION

The present subject matter relates generally to methods and systems for coordinating operations and sharing data between two or more domestic appliances.

BACKGROUND OF THE INVENTION

Domestic (e.g., household) appliances are used generally for a variety of tasks by a variety of users. For example, a household may include such appliances as laundry appliances (e.g., a washing machine or dryer appliance), kitchen appliances (e.g., a refrigerator, an oven, a cooktop, a range hood, a microwave, dishwasher, etc.), along with air conditioners, water heaters and various other appliances.

Some domestic appliances can also include features for connecting to and communicating over a secure wireless network. Such communication may provide connected features on the domestic appliances to permit the domestic appliance to communicate with a personal device, smart home systems, or a remote database such as a cloud server.

In spite of the proliferation of connected devices, the information exchanged or shared from devices can be fairly limited or rigid. For instance, one device may only be configured to share a fixed type of data relating to its operation (e.g., runtime, executed cycles, detected error codes, etc.). Some other device may receive this data. For example, a washing machine appliance may communicate input or detected cycle information to a connected dryer appliance. However, the storage or use of such data by the other device must usually be configured during assembly. Any changes to the type, amount, or frequency of data exchanged typically requires changing the software at each individual appliance. Moreover, users are often not given much, if any control, of how data is used or shared between appliances. This can lead to user frustrations or inefficient operation of certain appliances. These issues can be especially pronounced when one appliance is able to detect conditions (e.g., air temperature, water temperature, humidity level, etc.) that might affect the other appliance's performance but be difficult or slow to detect at the other appliance. Even if multiple appliances were configured to share data, it may be difficult to detect or know when to change sharing settings, such as when the room or location of one appliance is moved.

As a result, it would be useful to provide a system or method to address one or more of the above issues. In particular, it may be advantageous to provide a system or method in which the data shared between multiple devices was easily configurable (e.g., changeable by a user without having to make changes to individual appliances). Additionally or alternatively, a method of operating multiple domestic appliances that improves data handling (e.g., efficiency) would be advantageous.

BRIEF DESCRIPTION OF THE INVENTION

Aspects and advantages of the invention will be set forth in part in the following description, or may be obvious from the description, or may be learned through practice of the invention.

In one exemplary aspect of the present disclosure, a method of operating a first domestic appliance associated with a user account and a second domestic appliance associated with the user account is provided. The method may include receiving a parameter signal including a parameter value from the first domestic appliance associated with the user account and identifying the parameter value as corresponding to a sharable parameter. The method may also include recording the parameter value within a sharable field set of a pre-constructed table. The method may further include initiating, subsequent to recording the parameter value and according to a conditional setting of the pre-constructed table, operation of the second domestic appliance associated with the user account based on the parameter value.

In another exemplary aspect of the present disclosure, a method of operating a first domestic appliance associated with a user account and a second domestic appliance associated with the user account is provided. The method may include receiving a parameter signal including a parameter value from a first domestic appliance associated with a user account and identifying the parameter value as corresponding to a sharable parameter. The method may also include recording the parameter value within a sharable field set of a pre-constructed table. The sharable field set may include an appliance location field indicating a relative location for the first domestic appliance. The method may further include determining an excessive variation in the parameter value and changing the appliance location field to indicate an updated location for the first domestic appliance.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures.

Repeat use of reference characters in the present specification and drawings is intended to represent the same or analogous features or elements of the present invention.

DETAILED DESCRIPTION

Reference now will be made in detail to embodiments of the invention, one or more examples of which are illustrated in the drawings. Each example is provided by way of explanation of the invention, not limitation of the invention.

In fact, it will be apparent to those skilled in the art that various modifications and variations can be made in the present invention without departing from the scope of the invention. For instance, features illustrated or described as part of one embodiment can be used with another embodiment to yield a still further embodiment. Thus, it is intended that the present invention covers such modifications and variations as come within the scope of the appended claims and their equivalents.

As used herein, the terms "first," "second," and "third" may be used interchangeably to distinguish one component from another and are not intended to signify location or importance of the individual components. The terms "includes" and "including" are intended to be inclusive in a manner similar to the term "comprising." Similarly, the term "or" is generally intended to be inclusive (i.e., "A or B" is intended to mean "A or B or both"). In addition, here and throughout the specification and claims, range limitations may be combined or interchanged. Such ranges are identified and include all the sub-ranges contained therein unless context or language indicates otherwise. For example, all ranges disclosed herein are inclusive of the endpoints, and the endpoints are independently combinable with each other. The singular forms "a," "an," and "the" include plural references unless the context clearly dictates otherwise.

Approximating language, as used herein throughout the specification and claims, may be applied to modify any quantitative representation that could permissibly vary without resulting in a change in the basic function to which it is related. Accordingly, a value modified by a term or terms, such as "generally," "about," "approximately," and "substantially," are not to be limited to the precise value specified. In at least some instances, the approximating language may correspond to the precision of an instrument for measuring the value, or the precision of the methods or machines for constructing or manufacturing the components or systems. For example, the approximating language may refer to being within a 10 percent margin, i.e., including values within ten percent greater or less than the stated value. In this regard, for example, when used in the context of an angle or direction, such terms include within ten degrees greater or less than the stated angle or direction, e.g., "generally vertical" includes forming an angle of up to ten degrees in any direction, e.g., clockwise or counterclockwise, with the vertical direction V.

The word "exemplary" is used herein to mean "serving as an example, instance, or illustration." In addition, references to "an embodiment" or "one embodiment" does not necessarily refer to the same embodiment, although it may. Any implementation described herein as "exemplary" or "an embodiment" is not necessarily to be construed as preferred or advantageous over other implementations. Moreover, each example is provided by way of explanation of the invention, not limitation of the invention. In fact, it will be apparent to those skilled in the art that various modifications and variations can be made in the present invention without departing from the scope of the invention. For instance, features illustrated or described as part of one embodiment can be used with another embodiment to yield a still further embodiment. Thus, it is intended that the present invention covers such modifications and variations as come within the scope of the appended claims and their equivalents.

Figure 1:
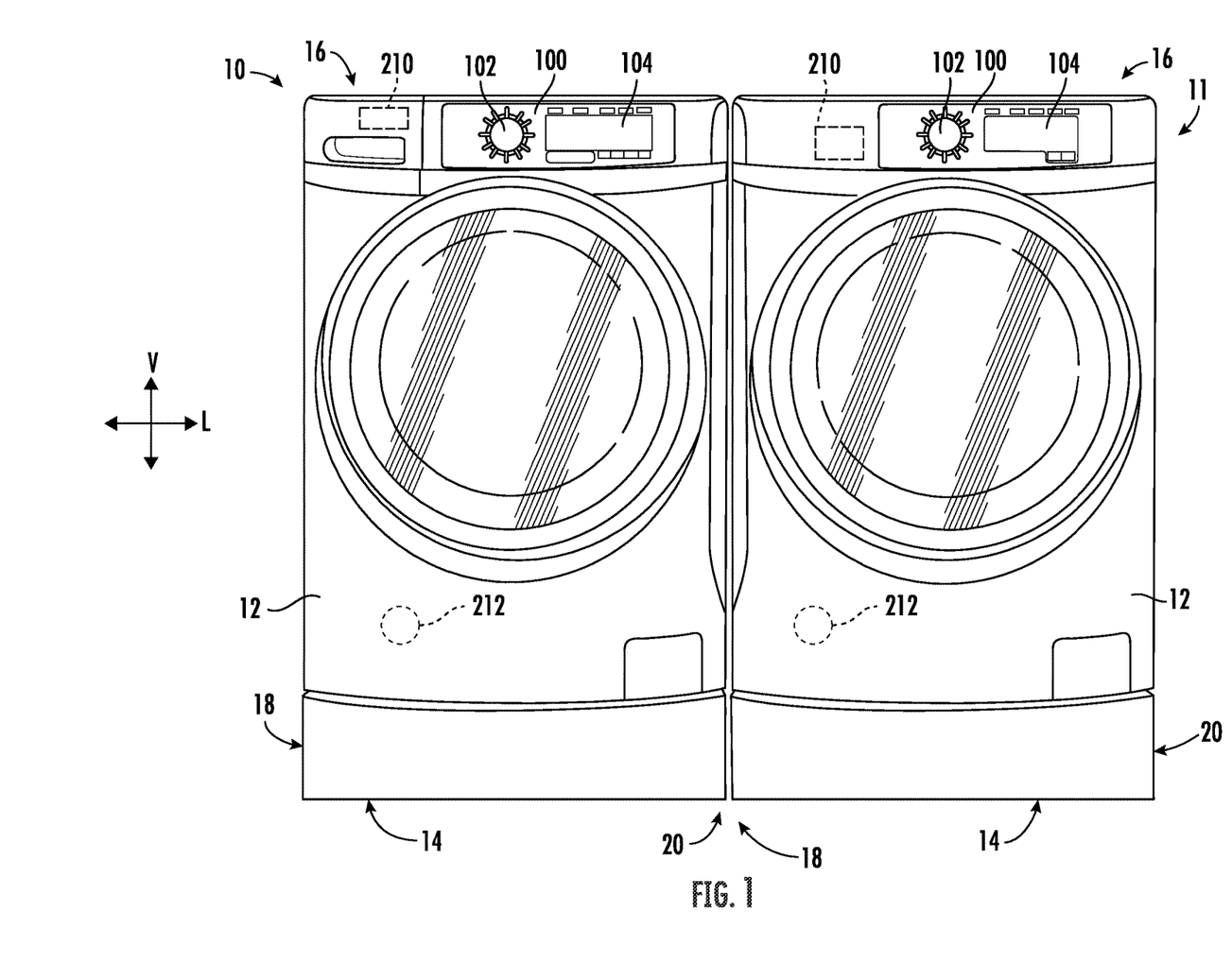
FIG. 1 provides a front, elevation view of domestic laundry appliances in accordance with exemplary embodiments of the present disclosure.
Figure 2:
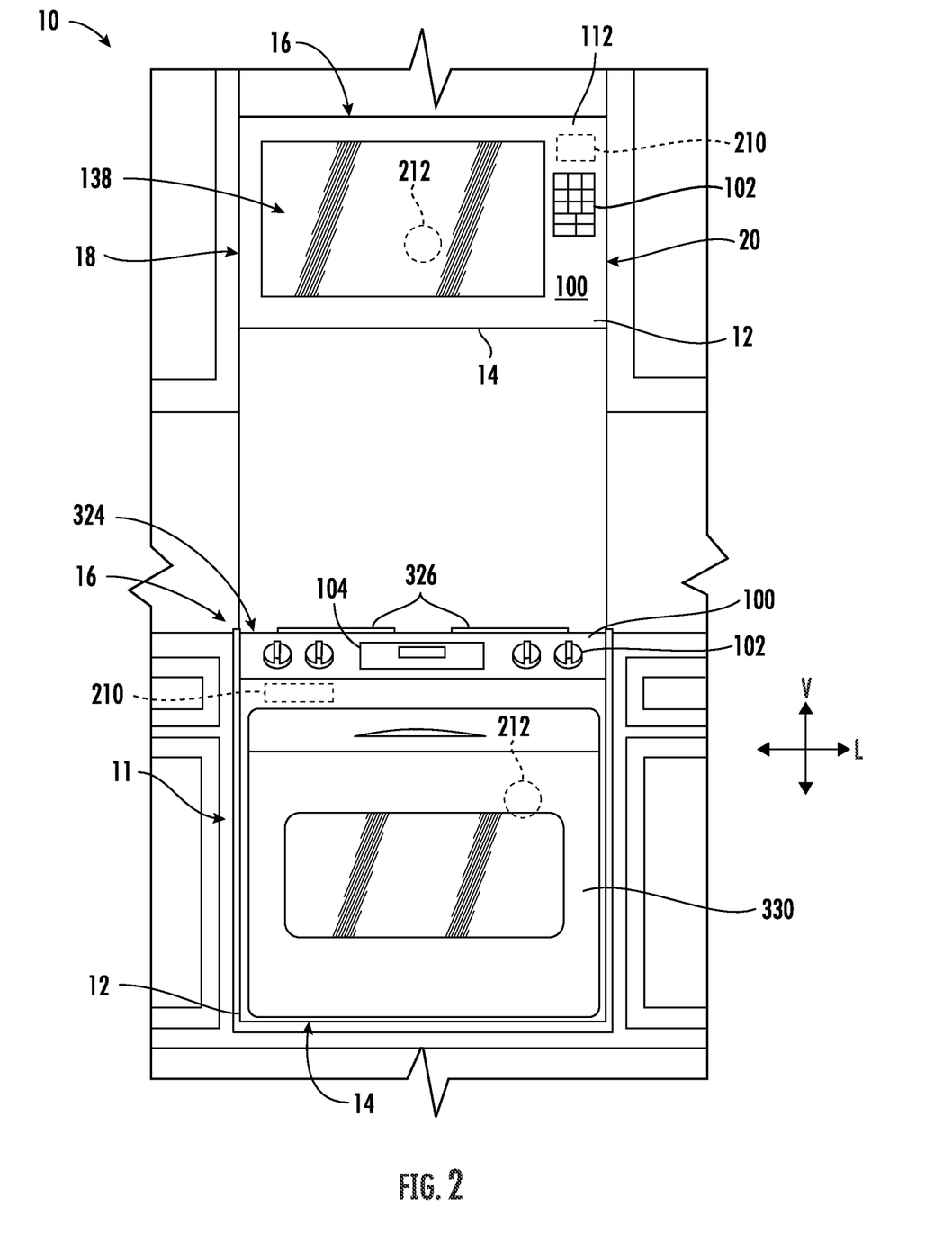
FIG. 2 provides a front, elevation view of domestic kitchen appliances in accordance with exemplary embodiments of the present disclosure.

Referring now to the figures, As may be seen in FIGS. 1 and 2, in accordance with one or more embodiments of the present disclosure, one or more appliances, such as a first appliance 10 and a second appliance 11, may be provided. The illustrated group of two appliances is provided by way of example only. Various embodiments of the present subject matter may also include three or more appliances.

As generally shown throughout FIGS. 1 and 2, each appliance 10 and 11 includes a cabinet 12 that defines a vertical direction V, a lateral direction L, and a transverse direction T that are mutually perpendicular. Each cabinet 12 extends between a top side 16 and a bottom side 14 along the vertical direction V. Each cabinet 12 also extends between a left side 18 and a right side 20 (e.g., along the lateral direction L) and a front side 22 and a rear side 24 (e.g., along the transverse direction T).

Each appliance 10 and 11 may include a user interface panel 100 and a control or user input device 102, which may be positioned on an exterior of the cabinet 12. The user input device 102 is generally positioned proximate to the user interface panel 100, and in some embodiments, the user input device 102 is positioned on the user interface panel 100.

In various embodiments, the user interface panel 100 may represent a general purpose I/O ("GPIO") device or functional block. In some embodiments, the user interface panel 100 may include or be in operative communication with user input device 102, such as one or more of a variety of digital, analog, electrical, mechanical or electro-mechanical input devices including rotary dials, control knobs, push buttons, and touch pads. The user interface panel 100 may include a display component 104, such as a digital or analog display device designed to provide operational feedback to a user. The display component 104 may also be a touchscreen capable of receiving a user input, such that the display component 104 may also be a user input device in addition to or instead of the user input device 102.

Separate from or in addition to the user interface panel 100, each appliance 10, 11 may include one or more sensors 212 to detect one or more parameters relevant to the appliance. Specifically, such sensors 212 may detect physical conditions in or around the corresponding appliance 10 or 11. Moreover, the detected physical conditions may be registered or measured as corresponding value (e.g., parameter value based on a voltage generated at the sensor 212). As a result, and as is generally understood, sensors 212 attached to an appliance 10, 11 may detect, measure, or otherwise determine a set parameter.

Exemplary embodiments of sensors 212 may include or be provided as a temperature sensor (e.g., thermistor, thermocouple, optical temperature sensor, etc.), humidity sensor (e.g., capacitive, resistive, or thermal conductivity humidity sensor), pressure sensor (e.g., strain gauge, variable reluctance, potentiometric, inductive, capacitive, or piezoelectric pressure sensor), or any other suitable sensing device capable of electric communication of detected parameters. Nonetheless, the exact sensors or types will naturally depend on the particular appliance onto which a sensor is incorporated, and should not limit the type of sensors that may be encompassed by or included with the present disclosure.

Generally, each appliance 10 and 11 may include a controller 210 in operative communication with the user input device 102, sensors 212, and one more electronic assemblies 214 (e.g., electrically controlled physical components) (FIG. 4), such as a pump, fan, heating element, sealed system, etc. The user interface panel 100, user input device 102, sensors 212, and electronic assemblies 214 may be in communication with the controller 210 via, for example, one or more signal lines or shared communication busses. Input/output ("I/O") signals may be routed between controller 210 and various operational components of the appliances 10 and 11. Operation of the appliances 10 and 11

(e.g., as performed by the electronic assemblies 214) may each be regulated by the respective controller 210 that is operatively coupled to (i.e., in operative communication with) the corresponding user interface panel 100 or sensors 212. A user interface panel 100 may for example provide selections for user manipulation of the operation of an appliance (e.g., via user input device 102 or display 104). In response to user manipulation of the user interface panel 100 or signals received from one or more sensors 212, the controller 210 may operate the various components or electronic assemblies 214 of the appliance 10 or 11.

Each controller 210 may include a memory and one or more microprocessors, CPUs, or the like, such as general or special purpose microprocessors operable to execute programming instructions or micro-control code associated with operation of the appliance 10 or 11. The memory may represent random access memory such as DRAM, or read only memory such as ROM or FLASH. In some embodiments, the processor executes programming instructions stored in memory. The memory may be a separate component from the processor or may be included onboard within the processor. Alternatively, a controller 210 may be constructed without using a microprocessor (e.g., using a combination of discrete analog or digital logic circuitry; such as switches, amplifiers, integrators, comparators, flip-flops, AND gates, and the like) to perform control functionality instead of relying upon software.

The controller 210 may be programmed to operate the respective appliance 10 or 11 by executing instructions stored in memory. For example, the instructions may be software or any set of instructions that when executed by the processing device, cause the processing device to perform operations. Controller 210 can include one or more processor(s) and associated memory device(s) configured to perform a variety of computer-implemented functions or instructions (e.g. performing the methods, steps, calculations, etc. and storing relevant data, as disclosed herein). It should be noted that controllers 210 as disclosed herein are capable of, and may be operable to perform, any methods and associated method steps as disclosed herein.

In some embodiments, for example, as illustrated in FIG. 1, a pair of laundry appliances may be provided as the first appliance 10 and the second appliance 11. In the exemplary embodiment illustrated in FIG. 1, the first appliance 10 may be a washing machine appliance and the second appliance 11 may be a dryer appliance. In embodiments such as illustrated in FIG. 1, the user input device 102 of each appliance 10 and 11 may be positioned on the user interface panel 100. The embodiment illustrated in FIG. 1 also includes a display 104 on the user interface panel 100.

FIG. 2 illustrates another exemplary embodiment of a group of appliance where the first appliance 10 or the second appliance 11 is/are kitchen appliances. In this example, the first appliance 10 is a microwave oven appliance that is generally positioned above the second appliance 11, which is a cooktop appliance (e.g., along the vertical direction V).

Microwave oven appliance as first appliance 10 includes a cabinet 12. A cooking chamber is defined within the cabinet 12 of the microwave oven appliance. The cooking chamber is accessible via a door 112 and viewable through a window 138 in the door 112. The microwave oven appliance is configured to heat articles (e.g., food or beverages) within the cooking chamber using electromagnetic radiation. The microwave oven appliance may include various components that operate to produce the electromagnetic radiation, as is generally understood. For example, the microwave oven appliance may include a magnetron (such as, for example, a cavity magnetron), a high voltage transformer, a high voltage capacitor, and a high voltage diode. The transformer may provide energy from a suitable energy source (such as an electrical outlet) to the magnetron. The magnetron may convert the energy to electromagnetic radiation, specifically microwave radiation. The capacitor generally connects the magnetron and transformer, such as via high voltage diode, to a chassis. Microwave radiation produced by the magnetron may be transmitted through a waveguide to the cooking chamber. The structure and intended function of microwave ovens are generally understood by those of ordinary skill in the art and are not described in further detail herein.

As shown, cooktop appliance as second appliance 11 includes a chassis or cabinet 12 that extends along the vertical direction V between a top side 16 and a bottom side 14. The cooktop appliance can include a cooktop surface 324 having one or more heating elements 326 for use in, for example, heating or cooking operations. In exemplary embodiments, cooktop surface 324 is constructed with ceramic glass. In other embodiments, however, cooktop surface 324 may include any another suitable material, such as a metallic material (e.g., steel) or another suitable non-metallic material. Heating elements 326 may be various sizes and may employ any suitable method for heating or cooking an object, such as a cooking utensil (not shown), and its contents. In one embodiment, for example, heating element 326 uses a heat transfer method, such as electric coils or gas burners, to heat the cooking utensil. In another embodiment, however, heating element 326 uses an induction heating method to heat the cooking utensil directly. In various embodiments, the heating elements 326 may include one or more of a gas burner element, resistive heat element, radiant heat element, induction element, or another suitable heating element.

In some embodiments, the cabinet 12 of the cooktop appliance may be insulated and may define a cooking chamber selectively enclosed by a door 330. One or more heating elements (e.g., top broiling elements or bottom baking elements) may be positioned within cabinet 12 of the cooktop appliance to heat the cooking chamber. Heating elements within the cooking chamber may be provided as any suitable element for cooking the contents of cooking chamber, such as an electric resistive heating element, a gas burner, a microwave element, a halogen element, etc. Thus, the cooktop appliance may be referred to as an oven range appliance. As will be understood by those skilled in the art, the cooktop appliance is provided by way of example only, and the present subject matter may be used in the context of any suitable cooking appliance, such as a double oven range appliance or a standalone cooktop (e.g., fitted integrally with a surface of a kitchen counter). Thus, the exemplary embodiments illustrated and described are not intended to limit the present disclosure to any particular cooking chamber or heating element configuration, unless explicitly indicated as such.

As illustrated, a user interface panel 100 may be provided on the cooktop appliance. Although shown at front portion of the cooktop appliance, another suitable location or structure (e.g., a backsplash) for supporting user interface panel 100 may be provided in alternative embodiments. In some embodiments, user interface panel 100 includes input components or controls 102, such as one or more of a variety of electrical, mechanical, or electro-mechanical input devices. Controls 102 may include, for example, rotary dials, knobs, push buttons, and touch pads. A controller 210 is in communication with user interface panel 100 and controls 102 through which a user may select various operational features and modes and monitor progress of the cooktop appliance. In additional or alternative embodiments, user interface panel 100 includes a display component, such as a digital or analog display in communication with a controller 210 and configured to provide operational feedback to a user. In certain embodiments, user interface panel 100 represents a general purpose I/O ("GPIO") device or functional block.

As shown, controller 210 is communicatively coupled (i.e., in operative communication) with user interface panel 100 and its controls 102. Controller 210 may also be communicatively coupled with various operational components of cooktop appliance 300 as well, such as heating elements (e.g., 326, 332), sensors 212, and the like. Input/output ("I/O") signals may be routed between controller 210 and the various operational components of the cooktop appliance. Thus, controller 210 can selectively activate and operate these various components. Various components of the cooktop appliance are communicatively coupled with controller 210 via one or more communication lines such as, for example, conductive signal lines, shared communication busses, or wireless communications bands.

According to various embodiments of the present disclosure, the appliances 10 or 11 may take the form of any of the examples described above, or may be any other domestic appliance. For instance, one or more domestic appliances may be provided as a kitchen hub appliance, humidifier appliance, range appliance, water heater appliance, air conditioning appliance (e.g., PTAC, VTAC, etc.), microwave appliance, oven appliance, refrigerator appliance, or dishwasher appliances, including all of the associated features, electronic assemblies, and sensors, as would be understood. Thus, it will be understood that the present subject matter is not limited to any particular domestic appliance.

Figure 3:
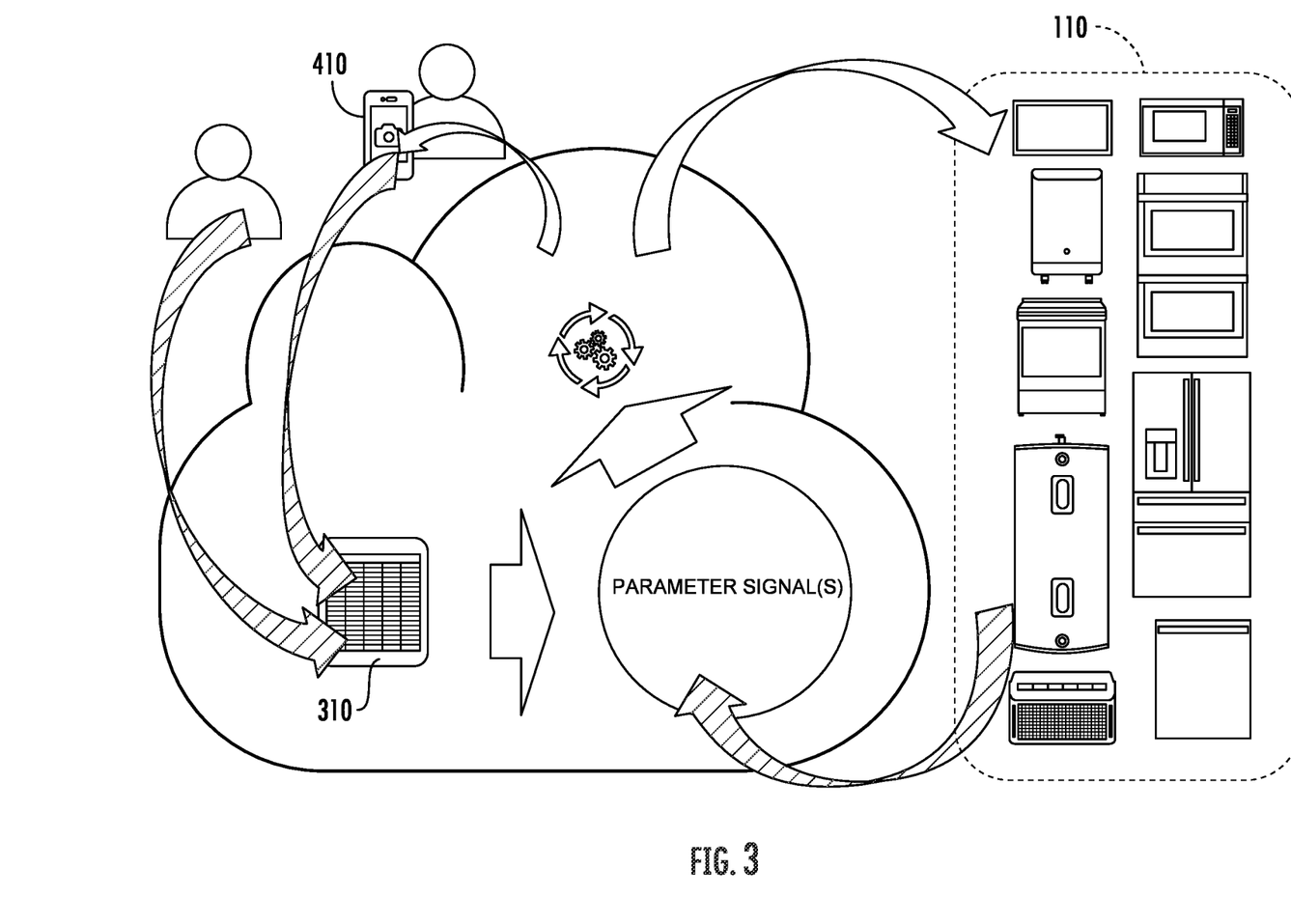
FIG. 3 provides a schematic view of a system for communicating between multiple domestic appliances according to exemplary embodiments of the present disclosure.
Figure 4:
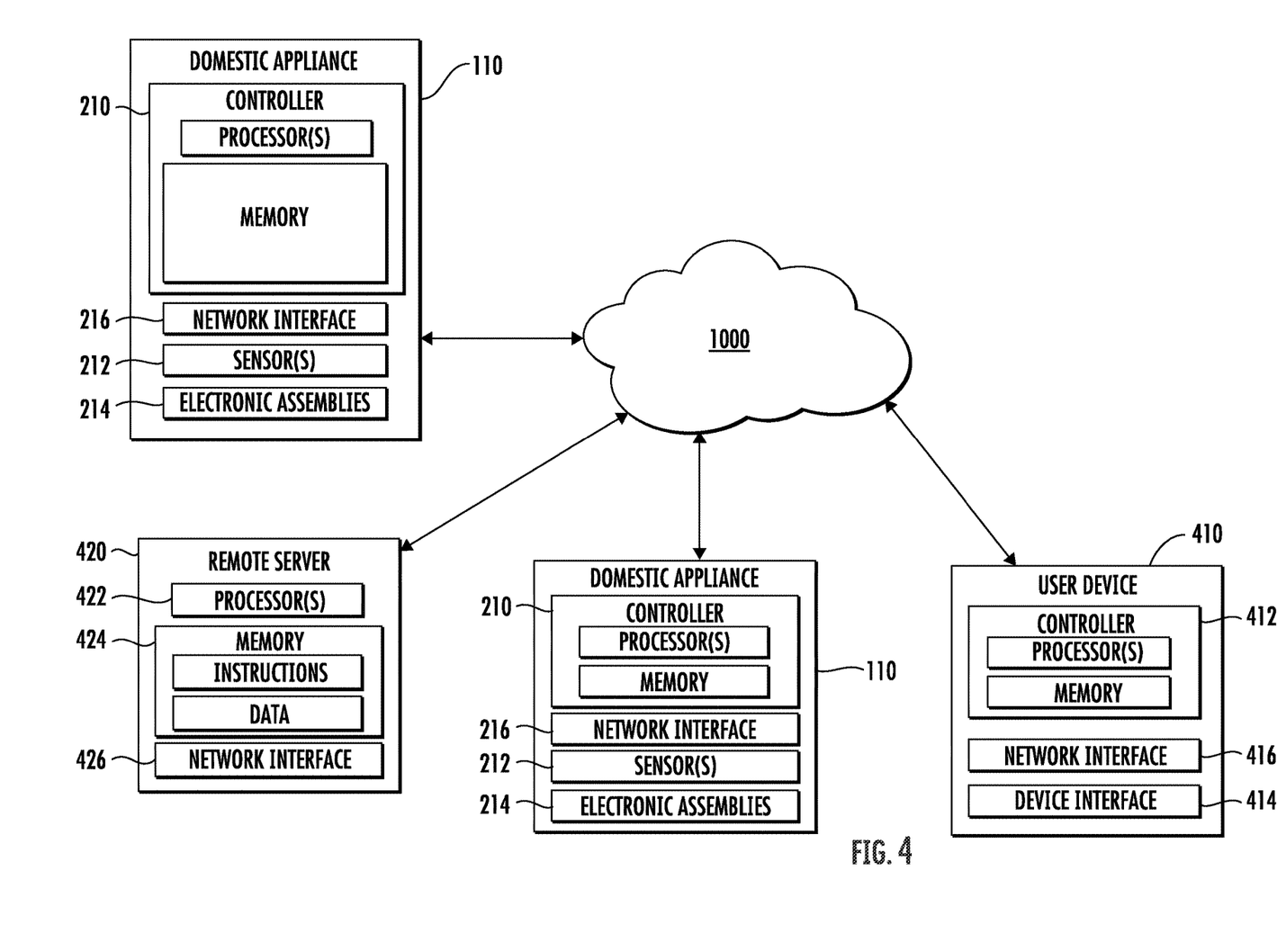
FIG. 4 provides a schematic view of a system for communicating between multiple domestic appliances according to exemplary embodiments of the present disclosure.

Turning now generally to FIGS. 3 and 4, multiple appliances 110 (e.g., first appliance 10 or second appliance 11-FIGS. 1 and 2) may be configured to communicate with each other or with one or more separate, external devices. For instance, controller 210 of one appliance 110 may be configured to communicate with another appliance 110, a remote user device 410, or remote server 420, either directly or via one or more intermediate devices or networks (e.g., network 1000).

As noted above, each appliance 110 may include a controller 210 that is communicatively coupled to one or more sensors 212 or electronic assemblies 214. Controller 210 may include one or more processors and one or more memory devices (i.e., memory). The one or more processors can be any suitable processing device (e.g., a processor core, a microprocessor, an ASIC, a FPGA, a microcontroller, etc.) and can be one processor or a plurality of processors that are operatively connected. The memory device A can include one or more non-transitory computer-readable storage mediums, such as RAM, ROM, EEPROM, EPROM, flash memory device, magnetic disks, etc., and combinations thereof. The memory devices can store data and instructions that are executed by the processor to cause the appliance 110 to perform operations. For example, instructions could be instructions for receiving/transmitting signals the sensors 212 or activating the electronic assemblies 214. The memory devices may also include data, such as one or more detected parameters, audio signals, video signals, instruction panels, etc., that can be retrieved, manipulated, created, or stored by processor.

Controller 210 includes a network interface 216 such that appliance 110 can connect to and communicate over one or more networks (e.g., network 1000) with one or more network nodes. Network interface 216 can be an onboard component of controller 210 or it can be a separate, off board component. Controller 210 can also include one or more transmitting, receiving, or transceiving components for transmitting/receiving communications with other devices communicatively coupled with appliance 110. Additionally or alternatively, one or more transmitting, receiving, or transceiving components can be located off board controller 210.

Network 1000 can be any suitable type of network, such as a local area network (e.g., intranet), wide area network (e.g., internet), low power wireless networks [e.g., Bluetooth Low Energy (BLE)], or some combination thereof and can include any number of wired or wireless links. In general, communication over network 1000 can be carried via any type of wired or wireless connection, using a wide variety of communication protocols (e.g., TCP/IP, HTTP, SMTP, FTP), encodings or formats (e.g., HTML, XML), or protection schemes (e.g., VPN, secure HTTP, SSL).

The remote user device 410 may be a laptop computer, smartphone, tablet, personal computer, wearable device, smart home system, or various other suitable devices including a device controller 412 and device interface 414 (e.g., buttons or touchscreen display). Generally, the remote user device 410 includes a device controller 412 having a memory (e.g., non-transitive storage media) for storing and retrieving programming instructions. For example, the remote user device 410 may be a smartphone operable to store and run applications (i.e., "apps") and may include a remote user interface provided as a smartphone app. Device controller 412 may include a network interface 416 such that remote user device 410 can connect to and communicate over one or more networks (e.g., network 1000) with one or more network nodes. Network interface 416 can be an onboard component of device controller 412 or it can be a separate, off board component. Device controller 412 can also include one or more transmitting, receiving, or transceiving components for transmitting/receiving communications with other devices communicatively coupled with remote user device 410. Additionally or alternatively, one or more transmitting, receiving, or transceiving components can be located off board controller 412.

In some embodiments, a remote server 420, such as a web server, is in operable communication with one or more appliances 110 or remote devices 410. The server 420 can be used to host an engagement platform (e.g., for sharing or facilitating a pre-constructed table 310, sensor readings or parameter values, etc., such as for a user account associated with multiple appliances 110). Additionally or alternatively, the server 420 can be used to host an information database (e.g., for storing user data or parameter values). The server 420 can be implemented using any suitable computing device(s). The server 420 may include one or more processors 422 and one or more memory devices 424 (i.e., memory). The one or more processors 422 can be any suitable processing device (e.g., a processor core, a microprocessor, an ASIC, a FPGA, a microcontroller, etc.) and can be one processor or a plurality of processors that are operatively connected. The memory device 424 can include one or more non-transitory computer-readable storage mediums, such as RAM, ROM, EEPROM, EPROM, flash memory devices, magnetic disks, etc., and combinations thereof. The memory devices 424 can store data and instructions which are executed by the processor 422 to cause remote server 420 to perform operations. For example, instructions could be instructions for receiving, transmitting, analyzing, or organizing parameter values from one or more appliances 110.

The memory devices 424 may also include data that can be retrieved, manipulated, created, or stored by processor 422. The data can be stored in one or more databases. The one or more databases can be connected to remote server 420 by a high bandwidth LAN or WAN, or can also be connected to remote server 420 through network 1000. The one or more databases can be split up so that they are located in multiple locales.

Remote server 420 includes a network interface 426 such that interactive remote server 420 can connect to and communicate over one or more networks (e.g., network 1000) with one or more network nodes. Network interface 426 can be an onboard component or it can be a separate, off board component. In turn, remote server 420 can exchange data with one or more nodes over the network 1000. As an example, remote server 420 can exchange data with one or more appliances 110 or user devices 410.

Generally, it is understood that remote server 420 may further exchange data with any number of client devices over the network 1000. The client devices can be any suitable type of computing device, such as a general-purpose computer, special purpose computer, laptop, desktop, integrated circuit, mobile device, smartphone, tablet, or other suitable computing device. In some embodiments, data, including parameter values from an appliance sensor 212, may thus be exchanged between appliances 110. Remote server 420 (e.g., the processor(s) and memory device(s) thereof) can be configured to perform a variety of computer-implemented functions or instructions (e.g. performing the methods, steps, calculations, etc. and storing relevant data, as disclosed herein). It should be noted that remote server 420, as disclosed herein is capable of, and may be operable to perform, any methods and associated method steps as disclosed herein.

During use, appliances 110 may be in communication with the separate external device 410 or 420 through various possible communication connections and channels, such as but not limited to wireless radio frequency (RF) channels (e.g., ZIGBEE®, BLUETOOTH®, WI-FI®, etc.) or any other suitable communication connection.

Figure 5:
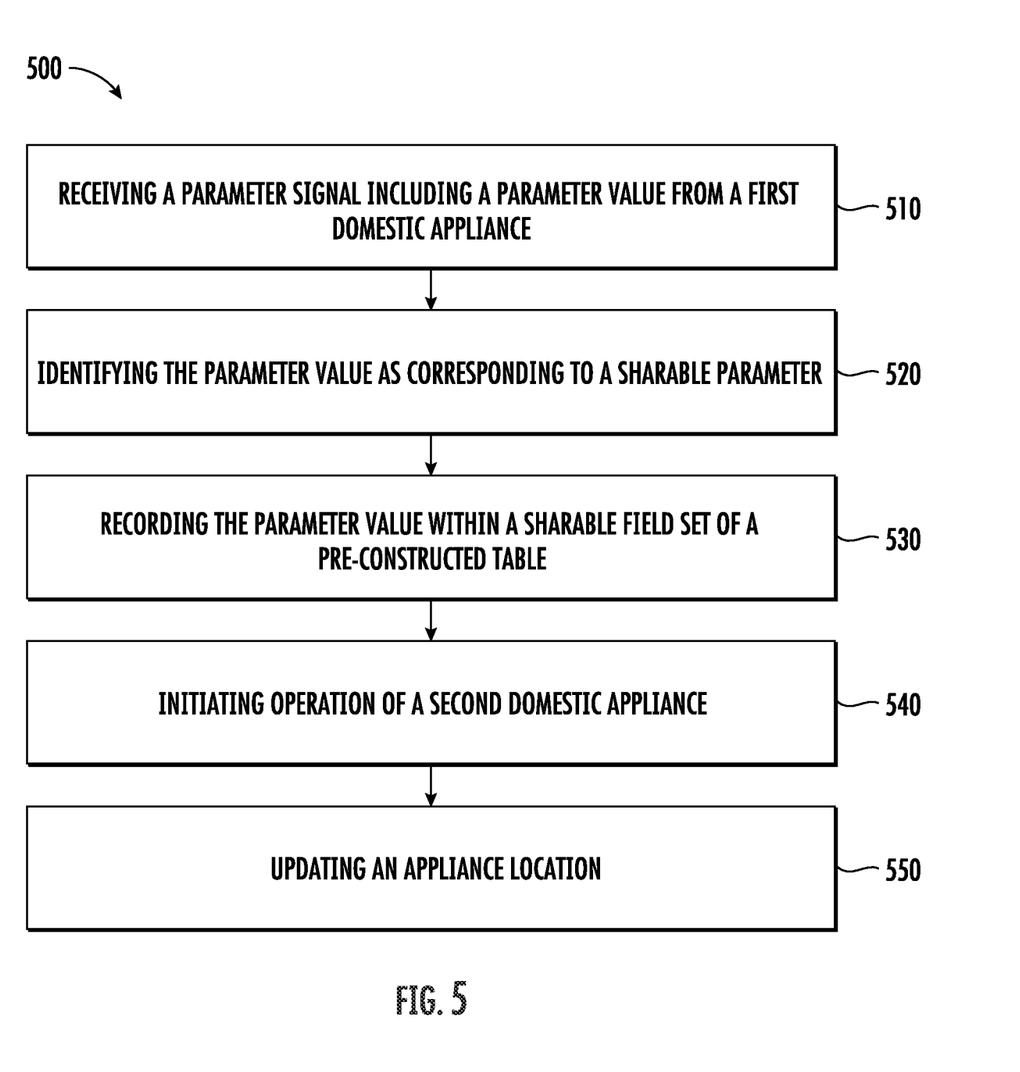
FIG. 5 provides a flow chart illustrating a method of method of operating multiple appliances according to exemplary embodiments of the present disclosure.

Turning now to FIG. 5, a flow chart is provided of a method 500 according to exemplary embodiments of the present disclosure. Generally, FIG. 5 provides a method of operating multiple appliances (e.g., appliances 110 or first and second appliances 10, 11) one or more sensors 212, as described above. The method 500 can be performed, for instance, by the remote server 420. During operations, the remote server 420 may send signals to and receive signals from two or more appliances.

Advantageously, methods in accordance with the present disclosure may permit data (e.g., parameter values) to be automatically shared between multiple appliances (e.g., without requiring direct user intervention at each appliance or duplicative sensors to detect such data). Additionally or alternative, the coordination may be centrally performed and easily configurable (e.g., based on the desires of an individual user) Further additionally or alternatively, methods in accordance with the present disclosure may improve data handling (e.g., performance or security) between multiple appliances associated with a single user account (e.g., account designating each appliance that a particular user owns or possesses across a single property or multiple properties). Still further additionally or alternatively, methods in accordance with the present disclosure may permit the relocation of a particular appliance to be automatically detected (e.g., without direct user input), for instance, such that the data shared to/from the particular appliance may be changed.

FIG. 5 depicts steps performed in a particular order for purpose of illustration and discussion. Those of ordinary skill in the art, using the disclosures provided herein, will understand that the steps of any of the methods disclosed herein can be modified, adapted, rearranged, omitted, or expanded in various ways without deviating from the scope of the present disclosure (except as otherwise described).

At 510, the method 500 includes receiving a parameter signal including a parameter value from a first domestic appliance. Such a parameter value may be detected at a particular corresponding sensor (e.g., as a temperature value, a humidity value, etc.) or electronic assembly (e.g., voltage draw, runtime, etc.) on the first appliance. Thus, the first domestic appliance may transmit one or more parameter values (e.g., to the remote server) with a parameter signal. A parameter name or title (e.g., generally indicating the type of data or value of the parameter value) may be included with the parameter signal.

In some embodiments, the parameter signal includes a unit identifier (e.g., media access control address) that corresponds to the first domestic appliance (e.g., the network interface thereof). The appliance type or location may be further included or known in advance. For instance, the user account may be programmed such that a particular unit identifier is known to be a particular type (e.g., model or general designation) of appliance. Thus, parameter signals including the unit identifier may be known to be from a particular type of appliance (i.e., embodied by the first domestic appliance). Additionally or alternatively, the user account may be programmed such that a relative location is known (e.g., set or selected by the user, such as via an app on the remote user device). The relative location may be specific to the house or building at which the first domestic appliance is installed, such as a physical address, a particular room chosen from a plurality of discrete rooms (e.g., "kitchen," "laundry room," "den," "garage," etc.), or a generalized region (e.g., "indoors" or "outdoors").

Similar information (e.g., unit identifier, appliance type, or location) may be known for each appliance associated with the user account, such as the second domestic appliance.

At 520, the method 500 includes identifying the parameter value as corresponding to a sharable parameter (e.g., air temperature, water temperature, humidity level, pressure, or another environmental condition at or near the corresponding appliance). Specifically, the parameter value may be identified as the type of value that can be shared with one or more additional appliances (e.g., the second domestic appliance). Such an identification may be based on, for instance, the parameter name, unit identifier, or location. Additionally or alternatively, the identification may be based on a sharing selection (e.g., made by a user or technician and programmed at a remote server for a user account). As an example, temperature values measured from an ambient temperature sensor on a refrigerator appliance may be selected for sharing. Thus, when an ambient temperature value is received from a particular refrigerator (e.g., identified as being at a predetermined location), the ambient temperature value may be identified as a sharable parameter.

At 530, the method 500 includes recording the parameter value within a sharable field set of a pre-constructed table. The pre-constructed table may be held or programmed apart from either the first or second domestic appliances (e.g., within the remote server). Thus, the table may be apart from the appliances and not reliant on the same. Generally, the pre-constructed table may include multiple sharable field sets, each field set providing a space (e.g., field or table cell) for a parameter value that is identified as being sharable. Along with the parameter value itself, the field set may include fields for additional data concerning or corresponding to the parameter value. As an example, the sharable field set may include an appliance location field indicating the relative location (e.g., physical address, room, or indoor/outdoor designation) for the first domestic appliance. Thus, the parameter value may be stored with an indication of the relative location at which it was measured.

The pre-constructed table may further include one or more conditional settings. Such conditional settings may dictate, control, or guide how data within a particular sharable field set is shared. Moreover, the conditional field settings may be alterable (e.g., able to be changed), such as by a technician or user (e.g., via an app on the remote user device) to permit the technician or user to change the conditions for sharing parameters within a particular sharable field set. Thus, one or more of the conditional settings may be a user-selected setting programmed by a user associated with the user account. Moreover, the conditional setting may be programmed prior to receiving the parameter signal.

In some embodiments, the conditional settings include a transmission schedule, which dictates or sets how often (e.g., the time, frequency, or rate at which) a particular parameter type or field set is updated (e.g., shared in a transmission to connected domestic appliance, such as the second domestic appliance). Thus, the transmission schedule may control how often or when the data within the corresponding field set is shared. In additional or alternative embodiments, the conditional settings include a receiver-type setting, which dictates or sets the type of appliance or which appliance from a plurality of appliances that can receive data from the corresponding field set. Thus, the receiver-type setting may ensure certain parameter values are only transmitted to (i.e., shared with) the types of appliances or specific user appliance at which such values may be useful (e.g., to influence or impact operation). In further additional or alternative embodiments, the conditional settings include a location setting, such as a location matching requirement, which dictates or sets relative location for appliances to receive data from the corresponding field set. Thus, the location setting may require a receiving (e.g., second) appliance to be at a specific relative location. Optionally, a requirement may be made that the receiving (e.g., second) appliance have a matching (i.e., the same) relative location with the originating (e.g., first) appliance.

At 540, the method 500 includes initiating operation of a second domestic appliance (e.g., according to a conditional setting of the pre-constructed table that is associated with the sharable field set). Specifically, operation of the second appliance may be based on the recorded parameter value. In some embodiments, subsequent to 530, 540 includes transmitting the parameter value from the sharable field set according to the conditional setting. Thus, prior to transmitting the parameter value, the sharable field set may be evaluated (e.g., using the conditional settings corresponding to that particular field set) to ensure the appropriate conditions are met for transmitting the parameter value of the sharable field set to the second domestic appliance. If more than two appliances are associated with the user account, 540 may include selecting a particular appliance (e.g., the second appliance) from a plurality of domestic appliances (e.g., based on a corresponding conditional setting).

After the parameter value is received at the second appliance, one or more actions of the second appliance may be influenced or affected by the received parameter value (e.g., as part of 540).

As one merely illustrative example, an ambient temperature value may be measured by a first refrigerator appliance and recorded as a parameter value that is received by a second dishwasher appliance at the same relative location (e.g., physical address, room, or indoors). At the dishwasher appliance, the ambient temperature value may be used to calculate dew point and control air flow exhausted to the room. Notably, the exhausted dew point may be used in order to minimize the risk of condensation on the floor. For instance, fan speed of a tub fan (e.g., drawing hot, moist air from a tub of the dishwasher) or a mixing fan (e.g., drawing ambient air to mix with the tub air) may be altered according to a set dew point (e.g., in order to reach the set dew point) for the air flow exhausted from the dishwasher, which may contact a dishwasher toe kick or the floor.

As another merely illustrative example, a tank water temperature value may be measured by a first water heater and recorded as a parameter value that is received by a second dishwasher appliance at a corresponding relative location (e.g., physical address, room, or indoors). At the dishwasher appliance, the tank water temperature value may be used to control or influence heating operations within a tub of the dishwasher. For instance, a tub water temperature value may be measured and, with the tank water temperature value, a pipe length from the water heater to the dishwasher may be estimated. Subsequently, an average or mean temperature of water coming into the dishwasher appliance could be estimated (e.g., during a normal fill of 0.8 gallons) since some amount of that water has been resting and cooling in the pipe. With the average temperature of incoming water known, the operational parameter can be changed according to a desired water temperature (e.g., in order to reach the desired water temperature) during wash cycles.

At 550, the method 500 includes updating an appliance location (e.g., based on the parameter value at 510). For instance, the parameter value may be analyzed to ensure that it conforms with one or more predetermined criteria. The predetermined criteria may include falling within a set value or range of values. Optionally, such set values or range of values may be determined based on past performance, such as a mean of past parameter values (e.g., of the same type). Thus, it may be determined if or when there excessive variation in the parameter value (e.g., if or when the parameter value falls outside of the set value or range of values). For instance, determining the excessive variation may include determining the recorded parameter value is greater than a set threshold value based on a plurality of past parameter values from the first domestic appliance.

Excessive variation in a parameter value may indicate that the first domestic appliance has changed locations (i.e., is no longer in the same relative location as was previously programmed). Based on a determination of excessive variation in the parameter value, 550 may include changing the appliance location field to indicate an updated location for the first domestic appliance. Optionally, a user may be prompted to select a new location in response to the excessive variation determination. Alternatively, the new location may be selected directly in response to the excessive variation determination.

After the new location is selected (e.g., and saved within the appliance location field of the corresponding field set), it may be determined if a current location of the second appliance matches or corresponds to the new location of the first appliance. If the locations match, continued sharing of subsequent parameter values may be permitted. By contrast, if the locations do not match (e.g., response to the changing of the appliance location field), the method 500 may include halting transmissions of subsequent parameter values to the second domestic from the first domestic appliance in response changing the appliance location field.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A method of operating a first domestic appliance associated with a user account and a second domestic appliance associated with the user account, the method comprising:
   receiving a parameter signal comprising a parameter value from the first domestic appliance associated with the user account;
   identifying the parameter value as corresponding to a sharable parameter, wherein a
   sharable field set comprises an appliance location field indicating a relative location for the first domes tic appliance;
   recording the parameter value within the sharable field set of a pre-constructed table;
   initiating, subsequent to recording the parameter value and according to a conditional setting of the pre-constructed table, operation of the second domestic appliance associated with the user account based on the parameter value;
   determining an excessive variation in the parameter value; and
   changing the appliance location field to indicate an updated location for the first domestic appliance;
   wherein determining the excessive variation comprises determining the parameter value is greater than a set threshold value based on a plurality of past parameter values from the first domestic appliance.

2. The method of claim 1, wherein initiating comprises transmitting the parameter value to the second domestic appliance according to the conditional setting.

3. The method of claim 2, wherein the conditional setting comprises a transmission schedule.

4. The method of claim 1, wherein the parameter signal comprises a unit identifier corresponding to the first domestic appliance.

5. The method of claim 1, wherein the parameter signal comprises a parameter identifier corresponding to a sensor of the first domestic appliance.

6. The method of claim 1, wherein the second domestic appliance is selected from a plurality of domestic appliances associated with the user account.

7. The method of claim 1,
   wherein a designated location of the second domestic appliance matches to the relative location for the first domestic appliance, and
   wherein the conditional setting comprises a location matching requirement between the first domestic appliance and the second domestic appliance.

8. The method of claim 1, further comprising:
   halting transmissions of subsequent parameter values to the second domestic appliance from the first domestic appliance in response changing the appliance location field.

9. The method of claim 1, wherein the conditional setting is a user-selected setting programmed by a user associated with the user account prior to receiving the parameter signal.

10. A method of operating a first domestic appliance associated with a user account and a second domestic appliance associated with the user account, the method comprising:
    receiving a parameter signal comprising a parameter value from the first domestic appliance associated with the user account;
    identifying the parameter value as corresponding to a sharable parameter, wherein a sharable field set comprises an appliance location field indicating a relative location for the first domestic appliance;
    recording the parameter value within the sharable field set of a pre-constructed table; and
    initiating, subsequent to recording the parameter value and according to a conditional setting of the pre-constructed table, operation of the second domestic appliance associated with the user account based on the parameter value,
    wherein a designated location of the second domestic appliance matches to the relative location for the first domestic appliance, and
    wherein the conditional setting comprises a location matching requirement between the first domestic appliance and the second domestic appliance,
    wherein the sharable field set comprises an appliance location field indicating a relative location for the first domestic appliance.

11. The method of claim 10, wherein initiating comprises transmitting the parameter value to the second domestic appliance according to the conditional setting.

12. The method of claim 11, wherein the conditional setting comprises a transmission schedule.

13. The method of claim 10, wherein the parameter signal comprises a unit identifier corresponding to the first domestic appliance.

14. The method of claim 10, wherein the parameter signal comprises a parameter identifier corresponding to a sensor of the first domestic appliance.

15. The method of claim 10, wherein the second domestic appliance is selected from a plurality of domestic appliances associated with the user account.

16. The method of claim 10, further comprising:
    determining an excessive variation in the parameter value; and
    changing the appliance location field to indicate an updated location for the first domestic appliance,
    wherein determining the excessive variation comprises determining the parameter value is greater than a set threshold value based on a plurality of past parameter values from the first domestic appliance.

17. The method of claim 10, further comprising:
    determining an excessive variation in the parameter value;
    changing the appliance location field to indicate an updated location for the first domestic appliance; and halting transmissions of subsequent parameter values to the second domestic appliance from the first domestic appliance in response changing the appliance location field.

18. The method of claim 10, wherein the conditional setting is a user-selected setting programmed by a user associated with the user account prior to receiving the parameter signal.

\* \* \* \* \*